J. H. & F. V. SMITH.
STEAM VULCANIZING PLANT.
APPLICATION FILED MAY 17, 1916.
1,256,385.
Patented Feb. 12, 1918.
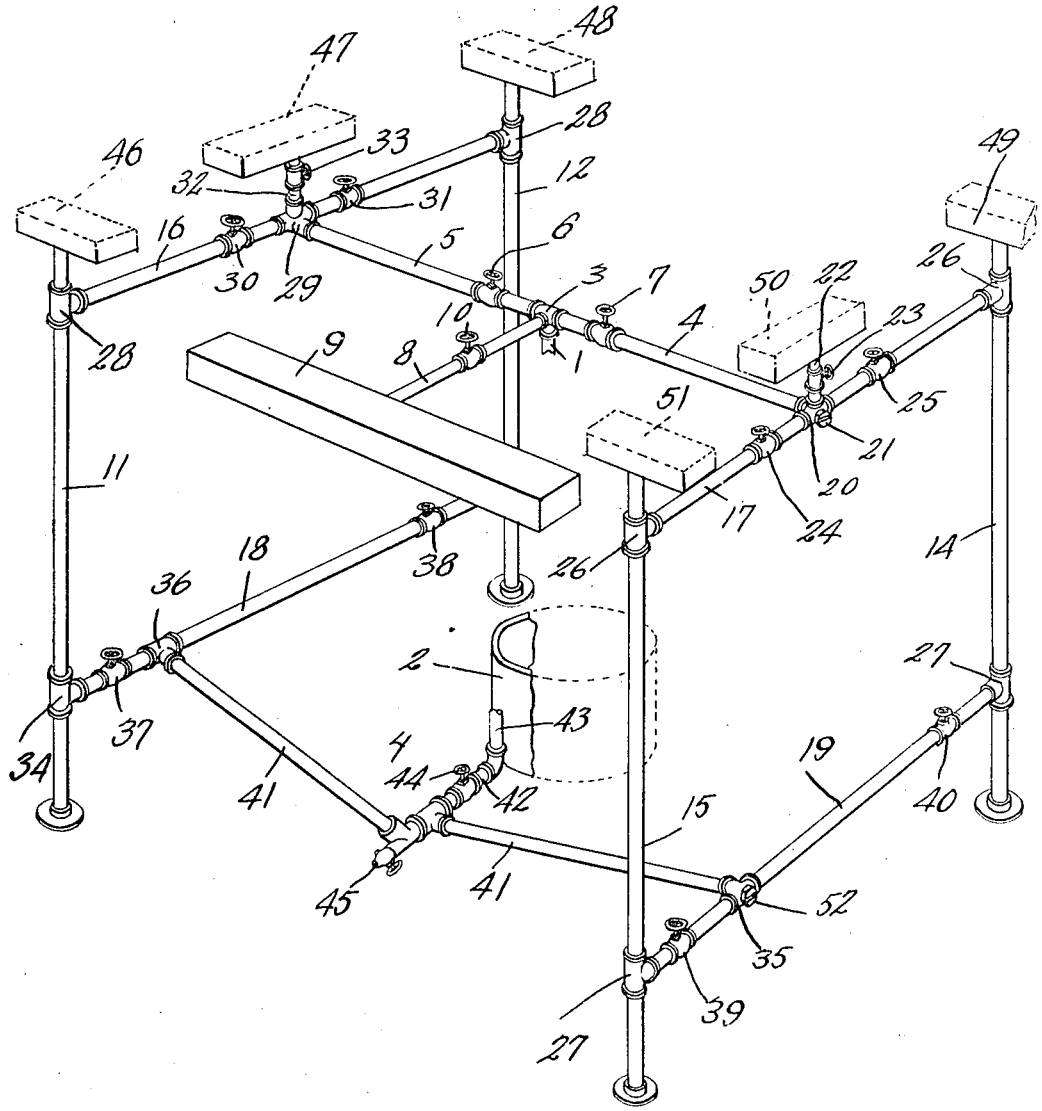
J. H. Smith and
F. V. Smith
Inventors,
Witnesses
by C. A. Snow & Co.
Attorneys

UNITED STATES PATENT OFFICE.

JAY HARLEY SMITH AND FLOYD VIRGIL SMITH, OF SAN FRANCISCO, CALIFORNIA.

STEAM VULCANIZING PLANT.

1,256,385. Specification of Letters Patent. Patented Feb. 12, 1918.

Application filed May 17, 1916. Serial No. 98,111.

*To all whom it may concern:*

Be it known that we, JAY HARLEY SMITH and FLOYD VIRGIL SMITH, citizens of the United States, residing at San Francisco, in the county of San Francisco, State of California, have invented a new and useful Steam Vulcanizing Plant, of which the following is a specification.

The device forming the subject matter of this application is a vulcanizer adapted to be employed particularly in connection with the vulcanization of tire casings.

The invention aims to provide novel means whereby, through the instrumentality of a supporting frame, steam may be conducted to the molds, and water of condensation may be conducted away from the molds.

With the above and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawing, the invention has been delineated in a single perspective figure, wherein parts are broken away.

In carrying out the present invention there is provided a vertical steam supply pipe 1 which may be connected with a source of steam supply such as a boiler 2. The boiler 2 has been shown diagrammatically and it is not necessary that a boiler, located as described, be resorted to, since the steam may be supplied from any suitable source. Interposed in the steam supply pipe 1 is a coupling 3 with which are united horizontal pipes 4 and 5. Interposed in the pipe 5 is a valve 6, a valve 7 being interposed in the pipe 4. Projecting from the coupling 3 is a horizontal pipe 8 connected with a table mold 9. Interposed in the pipe 8 is a valve 10.

The invention includes four tubular legs denoted respectively by the numerals 11, 12, 14 and 15. The numeral 16 designates a horizontal upper pipe, united by means of couplings 28 with the legs 11 and 12. The numeral 17 designates a horizontal upper pipe united by means of couplings 26 with the legs 14 and 15. At 18 there appears a horizontal lower pipe, united by means of couplings 34 with the legs 11 and 12. At 19 there is shown a horizontal lower pipe connected by means of couplings 27 with the legs 14 and 15. A coupling 20 unites the end of the pipe 4 with the intermediate portion of the pipe 17, the coupling 20 carrying a plug 21, whereby an enlargement of the plant is made possible. Upstanding from the coupling 20 is a pipe 22 in which is interposed a valve 23, the pipe 22 carrying a mold 50. Disposed in the pipe 17 upon opposite sides of the coupling 20, are valves 24 and 25.

The pipe 5 is connected with the pipe 16 by means of a coupling 29 which, it is to be understood, is provided with a plug like the plug 21 and adapted for a similar purpose. In the pipe 16 on opposite sides of the coupling 29, are placed valves 30 and 31. Upstanding from the coupling 29 is a pipe 32 carrying a valve 33. At the upper end of the pipe 32 there is disposed a mold 47.

A coupling 35 is interposed in the pipe 19 and carries a plug 52, so that the plant may be extended or enlarged. A coupling 36 is interposed in the pipe 18, the coupling 36 carrying a plug like the plug 52 and adapted for a similar purpose. Interposed in the pipe 18 on opposite sides of the coupling 36 are valves 37 and 38. Valves 39 and 40 are located in the pipes 19 on opposite sides of the coupling 35.

United at their outer ends with the couplings 35 and 36 are downwardly slanting pipes 41 connected with a pipe 42 terminating in a pipe 43 adapted to communicate with the boiler 2, if the boiler is used as a source of steam supply. The pipes 41 may be denominated a drip conduit connecting the lower pipes 18 and 19 and having an outlet 42 and 43. A valve 44 is interposed in the conduit 42, and the conduit 42 may be provided at one end with a drain or blow-off 45.

Assembled with the upper end of the leg 11 is a mold 46. The leg 12 carries a mold 48. A mold 49 is mounted on the upper end of the leg 14, the upper end of the leg 15 carrying a mold 51. The several molds hereinbefore described may be of any desired form, depending upon the nature of the work to be performed. They have been shown diagrammatically in the drawing, and without a descent into detail, since the present machine is not to be confined for use with any particular kind of a mold.

In practical operation, if the valves 6, 7, 31, 30, 25, 24, 23, 33 and 10 are open, steam will pass from the pipe 1 into the pipes 4 and 5, and thence to the pipes 16 and 17, and to the pipes 32 and 22, as well as to the pipe 8, all of the molds 9, 46, 47, 48, 49, 50 and 51 being heated. It will be observed that by a proper manipulation of the valves, the molds may be cut off from the source of steam supply. Thus, the mold 47 may be controlled by the valve 33, the mold 50 being controlled by the valve 23. The mold 48 may be controlled by the valve 31, and the mold 49 may be controlled by the valve 25. The mold 51 may be cut off from the source of steam supply by closing the valve 24, and a similar operation of the valve 30 will cut off the source of steam supply from the mold 46. The molds, further, may be cut off in groups. Thus, by closing the valves 24 and 30, the molds 51 and 46 will not be heated, and if the valves 31 and 25 be closed, then the molds 48 and 49 will not be heated. The table mold 9 may be controlled by means of the valve 10.

Water of condensation from the molds 51, 50, 49, 48, 47 and 46 will be conducted away through the pipes 16 and 17, the various legs 11, 12, 14 and 15, the pipes 18 and 19 and the pipes 41, the water of condensation thus being delivered back to the boiler 2, if a boiler is used, by means of the conduit 42 which may be controlled by the valve 44. The valve 38 controls the flow of water of condensation from the mold 48, the valve 40 exercising a similar function with respect to the mold 49, the water of condensation from the mold 51 being controlled by the valve 39, and the valve 37 having a similar operative relation to the mold 46.

Having thus described the invention, what is claimed is:—

1. In a device of the class described, a frame comprising four upright tubular legs defining the corners of a rectangle; upper pipes connecting the legs in pairs; lower pipes connecting the same legs in pairs; a steam pipe connecting the upper pipes intermediate their ends; an outstanding pipe connected with the steam pipe intermediate the ends of the latter; other pipes connected at their outer ends with the lower pipes intermediate the ends of the latter; a source of steam supply located within the contour of the frame and disposed to the rear of said other pipes; a connection leading from the top of said source to the intermediate portion of the steam pipe; a return pipe leading from the inner ends of said other pipes to the bottom of said source; molds carried by the upper ends of the legs; upright pipes upstanding from the upper pipes intermediate their ends; molds carried by the upright pipes; a mold carried by the outstanding pipe; a valve in the outstanding pipe between said mold and the connection; valves in the steam pipe on opposite sides of the connection; valves in the upright pipes and controlling the molds carried by the upright pipes; valves in the upper pipes and located upon opposite sides of the upright pipes and the steam pipe; valves in the lower pipes on opposite sides of said other pipes; and a valve in the return pipe between said other pipes and the source of steam supply.

2. In a device of the class described, a frame comprising four upright tubular legs; molds at the upper ends of the legs; upper pipes connecting the legs in pairs; lower pipes connecting the same legs in pairs; a steam pipe connecting the upper pipes; a source of steam supply communicating with the steam pipe; valves in the steam pipe on opposite sides of said source; molds connected with the upper pipes and located between the valves which are individual to said pipes; valves controlling the last specified molds; a mold connected with the steam pipe; a valve controlling said mold; a drip conduit connecting the lower pipes and having an outlet; and valves in the lower pipes and individual to the legs.

3. In a device of the class described, a frame comprising four upright legs; molds at the upper ends of the legs; upper pipes connecting the legs in pairs; lower pipes connecting the same legs in pairs; a steam pipe connecting the upper pipes; a source of steam supply communicating with the steam pipe; valves in the steam pipe on opposite sides of said source; valves in the upper pipes on opposite sides of the steam pipe; a drip conduit connecting the lower pipes and having an outlet; and valves in the lower pipes and individual to the legs.

In testimony that we claim the foregoing as our own, we have hereto affixed our signatures in the presence of two witnesses.

JAY HARLEY SMITH.
FLOYD VIRGIL SMITH.

Witnesses:
JOHN H. CRABBE,
HERBERT CRICHTON.

Copies of this patent may be obtained for five cents each, by addressing the "Commissioner of Patents, Washington, D. C."